(12) United States Patent  (10) Patent No.: US 8,025,469 B2
Ruan  (45) Date of Patent: Sep. 27, 2011

(54) INTELLIGENT LOGISTICS GOODS BINDING SYSTEM

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 370 days.

(21) Appl. No.: 12/408,621

(22) Filed: Mar. 20, 2009

(65) Prior Publication Data

US 2010/0166520 A1    Jul. 1, 2010

(30) Foreign Application Priority Data

Dec. 29, 2008    (CN) .......................... 2008 1 0187635

(51) Int. Cl.
*B60P 7/00*    (2006.01)

(52) U.S. Cl. ....................................... 410/103; 410/100

(58) Field of Classification Search .................. 410/100, 410/103, 12, 34, 97; 242/412; 254/220, 254/229, 343; 24/68 CD
See application file for complete search history.

(56) References Cited

U.S. PATENT DOCUMENTS 7,094,014 B1 *   8/2006   Qualls ........................... 410/100

* cited by examiner

*Primary Examiner* — Stephen Gordon
(74) *Attorney, Agent, or Firm* — Cheng Law Group, PLLC

(57) ABSTRACT

The present invention discloses an intelligent logistics goods binding system in the field of control technology. The problems of the conventional intelligent logistics goods binding systems, such as inconvenience in operation of the intelligent logistics goods binding system, low operation efficiency and complicated adjusting of control parameters, are addressed by the system of the invention. The intelligent logistics goods binding system of the invention includes an upper controller and a lower controller connected thereto. A sensor and a power mechanism are connected to the lower controller, which are respectively provided on the pay-out and take-up device. An upper input means is connected with the upper controller and a lower input means is connected to the lower controller. The activation or deactivation of the power mechanism is controlled by the upper controller through the lower controller or directly controlled by the lower controller based on the pressure signal of the sensor. According to the invention, one or more lower controllers could be controlled or set through one upper controller to form a system in which each tightener could work separately and be controlled in a centralized manner. The system of the invention further has the benefits of convenient operation, moderate tensioning force of the binding strip and high operation efficiency and safety.

10 Claims, 8 Drawing Sheets

INTELLIGENT LOGISTICS GOODS BINDING SYSTEM

BACKGROUND OF THE INVENTION

1. Field of Invention

The present invention relates to a tightener for binding goods for logistics transportation, in particular, to an intelligent logistics goods binding system for controlling a tightener in the field of control technology.

2. Related Art

Goods usually desire to be bound during transportation by automobiles to prevent the goods falling off and colliding with each other to cause loss or damage during travel of the automobiles. Though cords are conventionally directly used to bind the goods, they are work and time consuming and could hardly bind the goods tightly. The tightener is an advanced binding means, the use of which is very popular among drivers due to convenience and safety.

The conventional tightener is generally made of a holder, a belt axis and a binding strip. The belt axis is connected to the holder and rotatable. The binding strip is wound around the belt axis. A crowbar hole is set on the outer end of the belt axis beyond the holder. The crowbar is inserted into the crowbar hole to turn the crowbar to drive the belt axis to rotate when the goods are to be bound. The problem of such a mechanism lies in that the crowbar needs to be pulled out and reinserted every time it has been rotated some degree, which is work and time consuming and could hardly bind the goods tightly, thereby making the binding process low efficient.

To this end, various kinds of rapid binding devices are designed. For example, a worm wheel is fixedly connected to a belt axis and a worm moving is connected to the holder, which moves along the axial direction thereof. The worm is engaged with the worm wheel while the binding strip is tightened, in which the worm wheel could only rotate in one way and so could the belt axis. Therefore, the binding strip is tightened to bind the goods tightly. On the other hand, the worm is pulled by the operator to separate the worm from the worm wheel when the strip is to be rapidly loosened. In such a case, the belt axis could rapidly rotate in a reverse direction, and thereby the binding strip wound around the belt axis could be fast loosened.

Apparently, the belt axis could be controlled through the above-mentioned binding device with the disadvantage that the binding apparatus is complex to operate because the worm is turned by the operator, generating a low automation degree. In the prior art, though the worm is sometimes driven by the power mechanism to work, the condition of the tensioning force of the binding strip could not be obtained by the power mechanism and could no be controlled thereby during operation. Therefore, the goods are generally damaged and the binding strip could break for the goods are bound too tightly, or the transportation of the goods is adversely affected for the goods are not bound tightly enough. Moreover, the magnitude of the binding force is dependent on the nature and location of the goods, which makes manual control more difficult. It is work and time consuming if each of the tighteners is controlled respectively. In addition, the tensioning force of the binding strip of each tightener could be varied due to bumping and shocking, so that the tensioning force of the binding strip could be too large at some locations and too small at some other locations. It will also be very difficult to adjust each tightener separately.

SUMMARY OF THE INVENTION

In order to address the existing problem of the prior art, an object of the invention is to provide an intelligent logistics goods binding system which could be controlled in various manners, convenient in operation and has a high operation efficiency. The tensioning force of the binding strip could be controlled by using said system.

The object of the present invention is achieved by providing an intelligent logistics goods binding system comprising an upper controller and a lower controller connected to the upper controller for digital communication therewith. A sensor and a power mechanism are connected to the lower controller, which are respectively disposed on a pay-out and take-up device driving a tightener belt axis to tighten and loosen the binding strip. An upper input means is further connected to the upper controller for controlling the lower controller or controlling the operation of the power mechanism by the lower controller. A lower input means is further connected to the lower controller to control the operation of the power mechanism. When the operation of the power mechanism is controlled by the upper controller through the lower controller or directly controlled by the lower controller, the tensioning force signal of the binding strip collected by the sensor could be received by the lower controller and compared with a predetermined value of the tensioning force of the binding strip preset in the lower controller. The power mechanism could be controlled by the lower controller to cease operation when the tensioning force signal of the binding strip reaches the predetermined value of the tensioning force of the binding strip.

The operation of the power mechanism could be controlled by the upper controller and the lower controller independently. In general, the upper controller and the upper input means are mounted in the driver's room, and the lower input means and lower controller are mounted on the tightener.

When a signal is input from the upper input means or the lower input means by the operator to make the power mechanism work, a control signal is transmitted by the lower controller to the power mechanism to make it work. The power mechanism will start to work once the control signal is received, so as to drive the tightener belt axis to rotate in one way and tighten the binding strip. The sensor could real-timely collect the tensioning force signal of the binding strip and transmit said signal to the controller while the binding strip is being tightened. The tensioning force signal of the binding strip received by the lower controller is compared with the preset predetermined value of the tensioning force of the binding strip. If the tensioning force signal of the binding strip is smaller than the predetermined value of the tensioning force of the binding strip, the power mechanism continues working; and if the tensioning force signal of the binding strip reaches the predetermined value of the tensioning force of the binding strip, a control signal is generated by the lower controller to stop operation of the power mechanism. The power mechanism would stop working once said control signal is received. The automation degree for use of the tightener is largely improved and the tightener is easier to control by using the control system of the invention. In addition, the safety and reliability for goods transportation are promoted.

The tensioning force of the binding strip for the tightener could require to be adjusted due to bumping and shocking during transportation. In this case, the tensioning force of the binding strip for the tightener could be adjusted through the upper controller, and the tensioning force of the binding strip for the tightener could also be adjusted through the lower controller. During operation, the lower controller could always compare the signal received from the sensor with the predetermined value of the tensioning force of the binding strip. When the tensioning force of the binding strip is varied, the power mechanism is automatically controlled by the lower controller to operate again based on said comparison result, so as to tighten or loosen the binding strip. Therefore, the tensioning force of the binding strip is automatically adjusted to guarantee the safety of transportation.

According to the intelligent logistics goods binding system of the present invention, an upper communication module is connected to the upper controller, and a lower communicate module is connected to the lower controller for digital communication with the upper communication module. The sensor and the power mechanism could communicate with the upper controller via the upper communication module and the lower communication module.

According to the intelligent logistics goods binding system of the present invention, both the upper communication and the lower communication module are wireless communication modules. The communication mode herein could be accomplished by wires or in a wireless manner. The wireless communication makes the system configuration simpler and is more convenient in use.

According to the intelligent logistics goods binding system of the present invention, the lower controller includes a storage unit, a comparison unit and a control signal generation unit, in which the comparison unit could receive the tensioning force signals of the binding strip in the sensor and the storage unit and the predetermined value of the tensioning force of the binding strip and compare them, and then transfer the comparison result to the control signal generation unit.

The predetermined value of the tensioning force of the binding strip is disposed in the storage unit in advance. When the tensioning force signal of the binding strip collected by the sensor is received by the comparison unit, the predetermined value of the tensioning force of the binding strip could be invoked and compared with the tensioning force signal of the binding strip received by the comparison unit. The comparison result is transferred to the control signal generation unit which generates the corresponding control signal based on the comparison result.

According to the intelligent logistics goods binding system of the present invention, the lower controller further includes a clockwise and anti-clockwise rotation control unit for controlling the clockwise or anti-clockwise rotation of the power mechanism, which is connected with the control signal generation unit.

The power mechanism could be manually controlled to rotate in a clockwise or anti-clockwise manner through the clockwise or anti-clockwise rotation control unit. Thus, the pay-out or take-up operation is facilitated.

According to the intelligent logistics goods binding system of the present invention, the lower controller further includes a prompt signal generation unit which could generate a prompt signal when the tensioning force of the binding strip reaches various prompt values of the tensioning force of the binding strip set in the storage unit of the lower controller. The prompt signal generation unit is connected to the comparison unit. Several prompt lights are connected to the prompt signal generation unit, which could work in sequence and produce lights of different colors when the tensioning force of the binding strip reaches said various prompt values of the tensioning force of the binding strip. The prompt lights are connected with the prompt signal generation unit via a delay circuit.

While the binding strip is being tightened, the sensor could real-timely collect the tensioning force signal of the binding strip, and the comparison unit could compare the tensioning force signal of the binding strip with the prompt values of the tensioning force of the binding strip set in the storage. The prompt signal generation unit could generate a signal to make the prompt lights operate when the tensioning force of the binding strip is larger than the prompt values of the tensioning force of the binding strip. Several prompt values of the tensioning force of the binding strip could be provided herein, each of which is corresponding to one prompt light. This way, the user could understand the approximate range of the tensioning force of the binding strip for timely adjust and control in a manual manner when different prompt lights generate lights of different colors. Moreover, the power consumption is reduced through the delay circuit. The number of the prompt lights could be set to requirements here.

According to the intelligent logistics goods binding system of the present invention, a plurality of lower controllers are connected to the upper controller, each of which is connected to the sensor and the power mechanism correspondingly located on one pay-out and take-up device. One lower input means is connected to each of the lower controllers.

The plurality of lower controllers could be controlled and set by one upper controller to form a more convenient system in which each tightener could work separately and be controlled in a centralized manner.

According to the intelligent logistics goods binding system of the present invention, the upper controller and the lower controllers further respectively include an initialization unit, a query unit for inquiring the current tensioning force of the binding strip for the tightener, a display unit for displaying information and a set unit for setting the predetermined value of the tensioning force of the binding strip or the prompt values of the tensioning force of the binding strip.

The system could be kept in the state of former use through the initialization unit. The user could so conveniently inquire the magnitude of the tensioning force of the binding strip through the query unit that the operation condition of the tightener could be obtained at any time and the control of the tightener could be adjusted correspondingly in due time. The user could directly observe various kinds of information of the tightener through the display unit and operate it more conveniently, thereby significantly improving the controllability and safety of the tightener. The displayed information includes, but not limited to, the predetermined value of the tensioning force of the binding strip and the actual value of the tensioning force of the binding strip. The user could conveniently set and adjust various kinds of control parameters of the system through the set unit, making the use of the tightener more flexible and widely applicable.

According to the intelligent logistics goods binding system of the present invention, the upper controller further includes a locking/unlocking unit for making the lower controllers in an operation locked status or an operation allowable status. The upper controller further includes a selection unit for activating or deactivating the lower controllers.

The lower controllers are in the operation locked status or operation allowable status through the locking/unlocking unit, improving safety of the entire system. All the lower controllers are not entitled to operation and all the operations on the lower controllers are invalid when they are in the operation locked status. The lower controllers could be operated only they are in the operation allowable status.

The tightener desired to work could be selected with the selection unit. The power mechanism is out of work when the tightener is deactivated. The tightener desired to be used could be conveniently selected through such a configuration.

According to the intelligent logistics goods binding system of the present invention, the pay-out and take-up device includes a casing fixedly connected to the side of a tightener holder and a worm, a worm axis and a worm wheel set within the casing. The tightener belt axis is rotatably connected with the tightener holder with one end of the tightener belt axis extending out of the tightener holder and being fixedly connected to the worm wheel. The worm is covered on the worm axis and fixedly connected thereto. The worm axis is provided on the side of the worm wheel and could move along the axial direction thereof within the casing. The power mechanism is connected to the worm axis via a deceleration mechanism and could drive the worm axis to rotate, in which the power mechanism is any one selected from the group consisting of an electric motor and a pneumatic motor. The sensor is provided between the casing and the worm or between the casing and the worm axis. The sensor could transmit a pressure signal corresponding to the tensioning force of the binding strip to the lower controller when the sensor is pressed.

When the power mechanism is operated, the worm axis could be driven to rotate. The rotation of the worm could drive the worm wheel to rotate when the worm is engaged with the worm wheel. As the worm wheel and worm have a function of reverse self-locking, the worm wheel could only rotate in one way, and the binding strip is tightened by the belt axis during unidirectional rotation to bind the goods tightly. The sensor of the invention could be a pressure sensor, a torque sensor or the like, the location of which could be set at various sites. The tensioning force of the binding strip is proportional to the pressure of the worm or worm axis of the tightener when the tightener works, so that the tensioning force of the binding strip on the belt axis will be increased as the axial pressure of the worm or worm axis of the tightener increases. To this end, the sensor is provided between the casing and the worm or between the casing and the worm axis in the invention. This way, the magnitude of the tensioning force of the binding strip could be conveniently detected when the sensor is pressed.

Compared with the prior art, the intelligent logistics goods binding system has the advantages as follows. Firstly, the tensioning force of the binding strip could be real-timely transferred to the controller via the sensor, in which case the controller could real-timely control the tightener to bring use of the tightener more convenient and safer and the magnitude of the tensioning force of the binding strip moderate. Secondly, a plurality of tighteners could be automatically controlled to work simultaneously, so that the tensioning force of the binding strip could be easily mastered, the operation and use of the tighteners are convenient with high operation efficiency and each of the tighteners could be controlled independently in a flexible manner. Thirdly, various kinds of the parameters of the system could be conveniently adjusted, making the tightener widely applicable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 1:
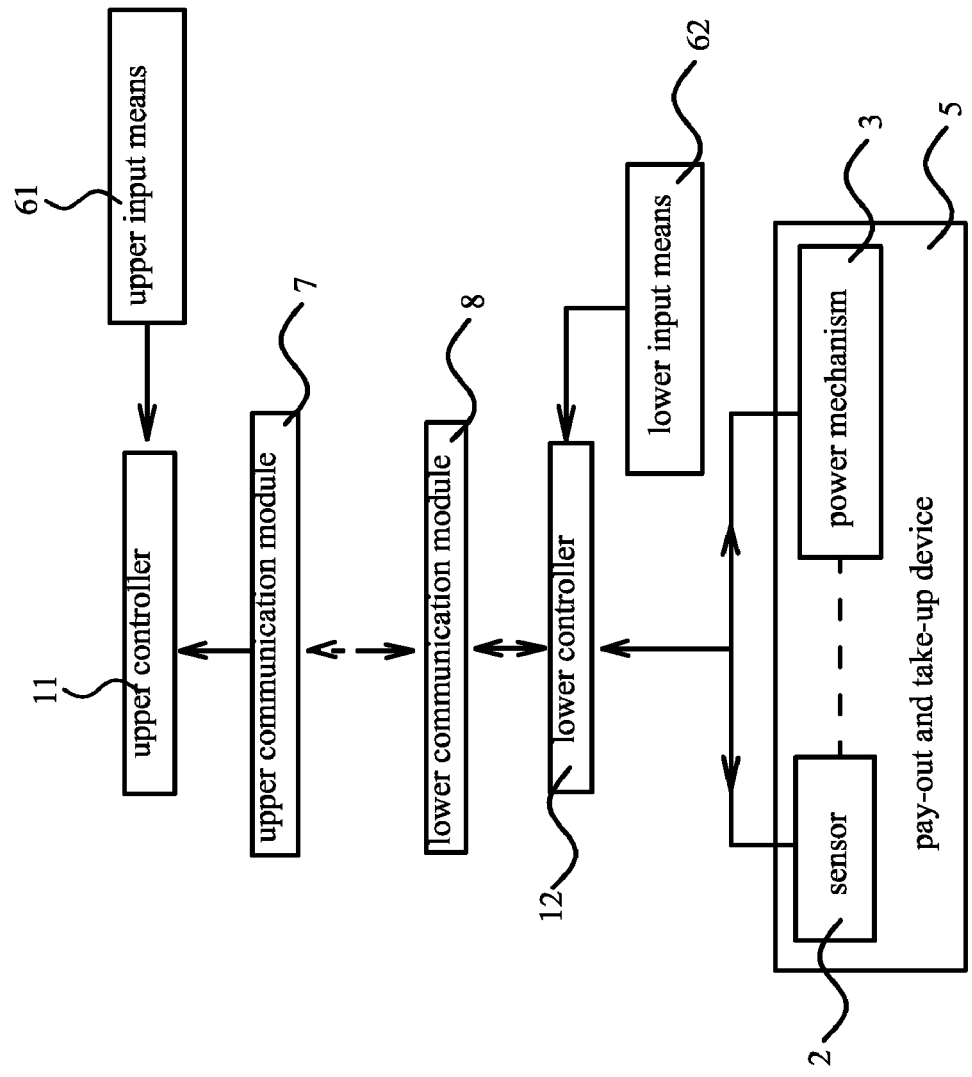
FIG. 1 is a block diagram of the principle of the first embodiment of the present invention.

As shown in FIG. 1, the intelligent logistics goods binding system of the invention includes an upper controller 11 and a lower controller 12 connected to the upper controller 11 for digital communication therewith. A sensor 2 and a power mechanism 3 are connected to the lower controller 12. The sensor 2 and the power mechanism 3 are provided on a pay-out and take-up device 5 driving a tightener belt axis 4 to tighten and loosen the binding strip. An upper input means 61 is further connected to the upper controller 11 for controlling the lower controller 12 or controlling the operation of the power mechanism 3 by the lower controller 12. A lower input means 62 is further connected to the lower controller 12 to control the operation of the power mechanism 3. When the operation of the power mechanism 3 is controlled by the upper controller 11 through the lower controller 12 or directly controlled by the lower controller 12, the tensioning force signal of the binding strip collected by the sensor 2 could be received by the lower controller 12 and compared with a predetermined value of the tensioning force of the binding strip preset in the lower controller 12. The power mechanism 3 could be controlled by the lower controller 12 to cease operation when the tensioning force signal of the binding strip reaches the predetermined value of the tensioning force of the binding strip. The automatic control of the tightener could be conveniently achieved and the safety performance of the entire binding system could be improved by such a configuration.

The tightener could be controlled through the upper controller 11 as well as the lower controller 12. Therefore, the tightener could be conveniently employed in a flexible control mode. The upper controller 11 and the upper input means 61 are generally provided in the driver's room and the lower controller 12 and the lower input means 62 are distributed on the required binding positions.

In said embodiment, an upper communication module 7 is connected to the upper controller 11 and a lower communication module 8 is connected to the lower controller 12 for digital communication with the upper communication module 7. Both the upper communication module 7 and the lower communication module 8 are wireless communication modules.

Figure 3:
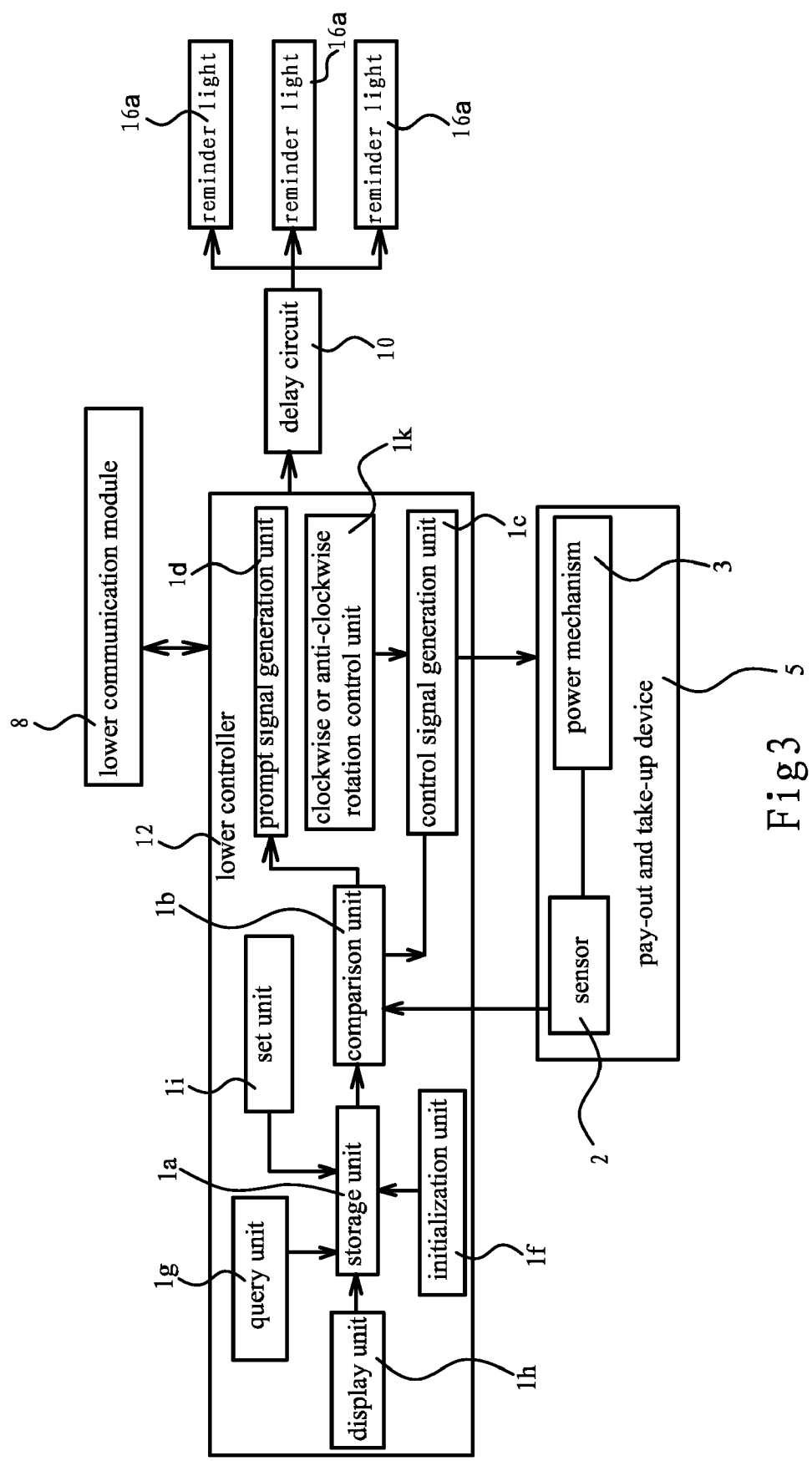
FIG. 3 is a structural block diagram of the lower controller of the present invention.

As shown in FIG. 3, the lower controller 12 includes a storage unit 1a, a comparison unit 1b and a control signal generation unit 1c. The comparison unit 1b could receive the tensioning force signals of the binding strip in the sensor 2 and the storage unit 1a and the predetermined value of the tensioning force of the binding strip respectively and compare them, and then transfer the comparison result to the control signal generation unit 1c.

The lower controller further 12 further includes an initialization unit 1f, a query unit 1g for inquiring the current tensioning force of the binding strip for the tightener, a display unit 1h for displaying system information and a set unit 1i for setting the predetermined value of the tensioning force of the binding strip or the prompt values of the tensioning force of the binding strip. The initialization unit 1f, query unit 1g, display unit 1h and set unit 1i are connected with the storage unit 1a. The system could be kept in the state of former use through the initialization unit 1f. The user could so conveniently inquire the magnitude of the tensioning force of the binding strip through the query unit 1g that the operation condition of the tightener could be obtained at any time and the control of the tightener could be adjusted correspondingly in due time. The user could directly observe various kinds of information of the tightener through the display unit 1h and operate it more conveniently, thereby significantly improving the controllability and safety of the tightener. The displayed information includes, but not limited to, the predetermined value of the tensioning force of the binding strip, the actual value of the tensioning force of the binding strip and the like. The user could conveniently set and adjust various kinds of control parameters of the system through the set unit 1i, making the use of the tightener more flexible and widely applicable.

The lower controller 12 further includes a clockwise and anti-clockwise rotation control unit 1k for controlling the clockwise or anti-clockwise rotation of the power mechanism 3, which is connected with the control signal generation unit 1c. The clockwise or anti-clockwise rotation of the power mechanism 3 could manually controlled via the clockwise or anti-clockwise rotation control unit 1k in a convenient way to facilitate the loosening and tightening operations.

The lower controller 12 further includes a prompt signal generation unit 1d which could generate a prompt signal when the tensioning force of the binding strip reaches various prompt values of the tensioning force of the binding strip set in the storage unit 1a of the lower controller 12. The prompt signal generation unit 1d is connected to the comparison unit 1b. Three prompt lights 9 are connected to the prompt signal generation unit 1d, which could work in sequence and produce lights of different colors when the tensioning force of the binding strip reaches said various prompt values of the tensioning force of the binding strip. The prompt lights 9 are connected with the prompt signal generation unit 1d via a delay circuit 10. In this embodiment, the number of the prompt lights 9 is three and the prompt lights are LED lights. The prompt lights 9 have a two green lights and a red light. The conditions of the lights are described as follows: all the three lights are dark when the tensioning force of the binding strip, i.e., the pressure received by the sensor 2, is less than 0.1 tons. When the tensioning force of the binding strip, i.e., the pressure received by the sensor 2, is larger than or equal to 0.1 tons and smaller than 1.0 ton, one of the green lights is bright. When the tensioning force of the binding strip, i.e., the pressure received by the sensor 2, is larger than and equal to 1.0 ton and smaller than 2.0 tons, both green lights are bright. When the tensioning force of the binding strip, i.e., the pressure received by the sensor 2, is larger than and equal to 2.0 tons, all the lights are bright. In order to save power consumption, all the lights are dark after they work for 30 seconds, in which case all the lights are dark regardless of the pressure. The user could conveniently understand the approximate scope of the current tensioning force of the binding strip when different prompt lights 9 could generate lights of different colors, so as to manually adjust and control the tightener in due time.

Figure 4:
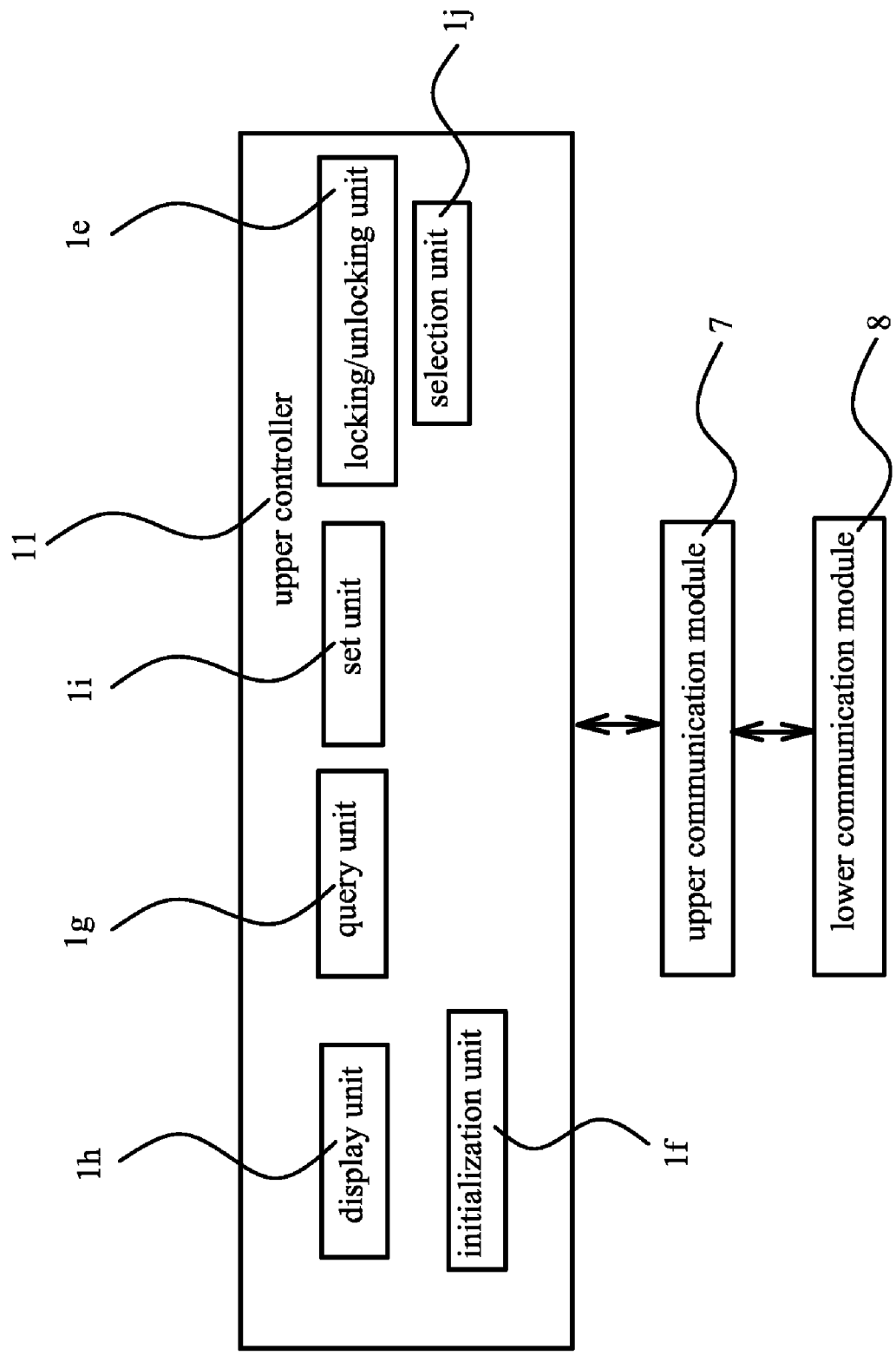
FIG. 4 is a structural block diagram of the upper controller of the present invention.
Figure 5:
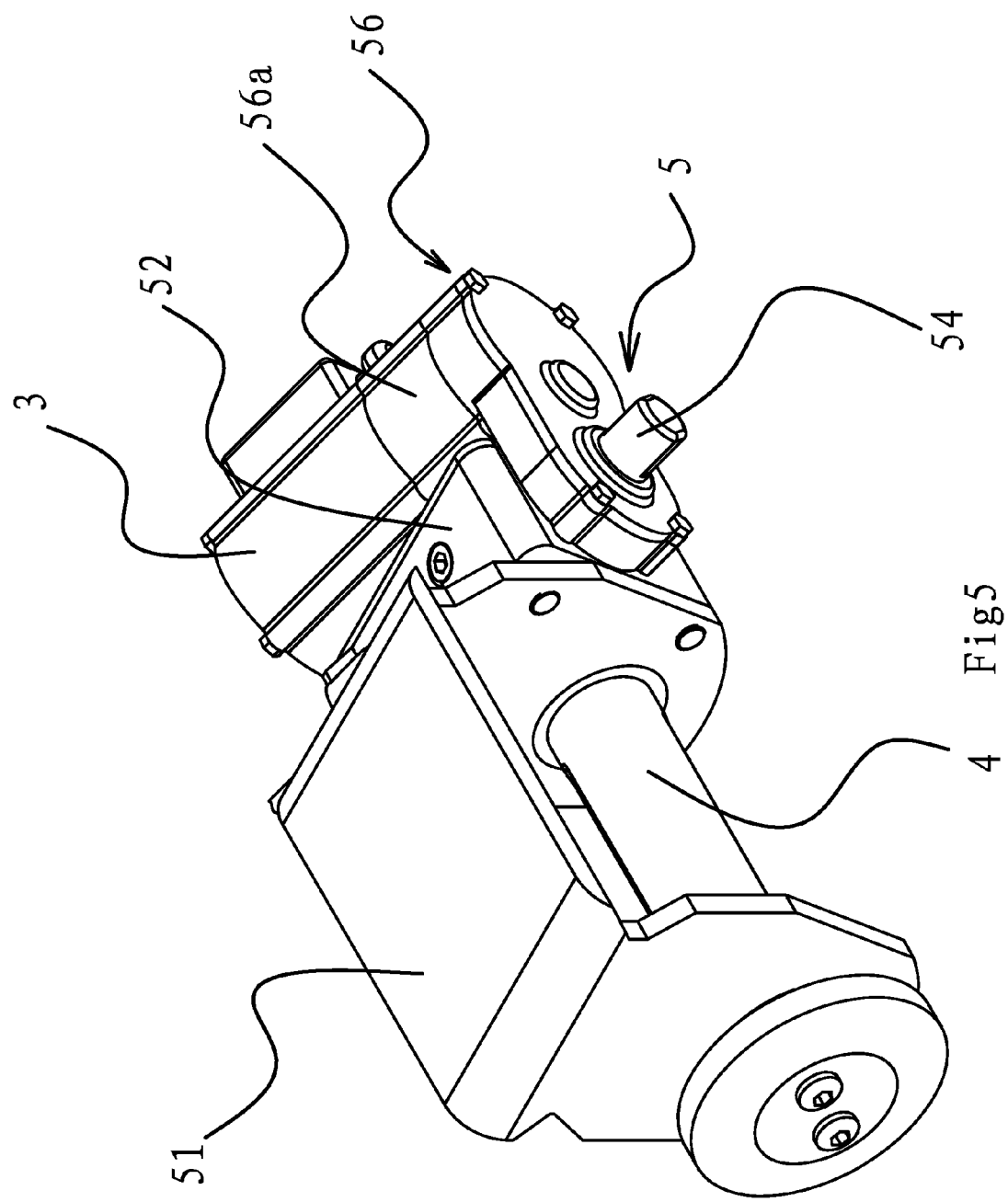
FIG. 5 is a stereogram of the pay-out and take-up device of the present invention.
Figure 6:
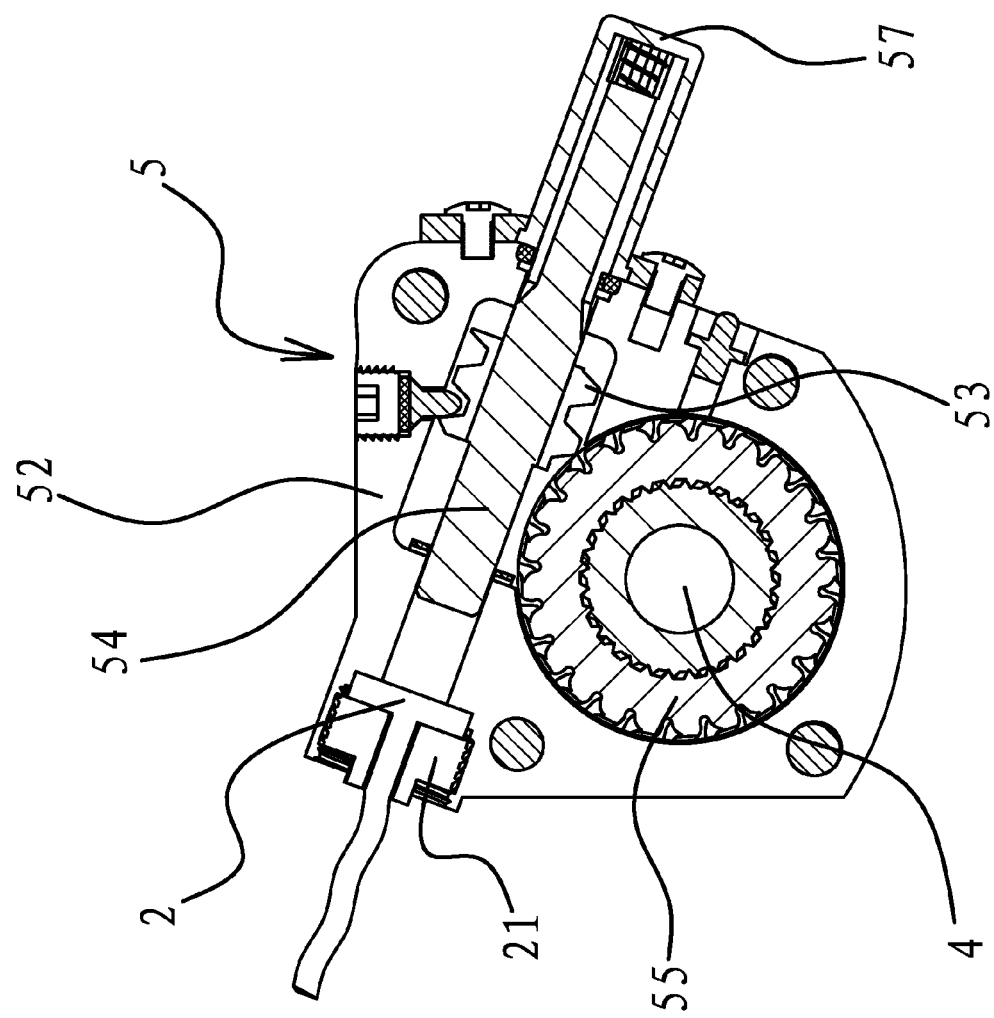
FIG. 6 is a sectional view of the pay-out and take-up device of the invention when the worm axis is separated from the sensor.
Figure 7:
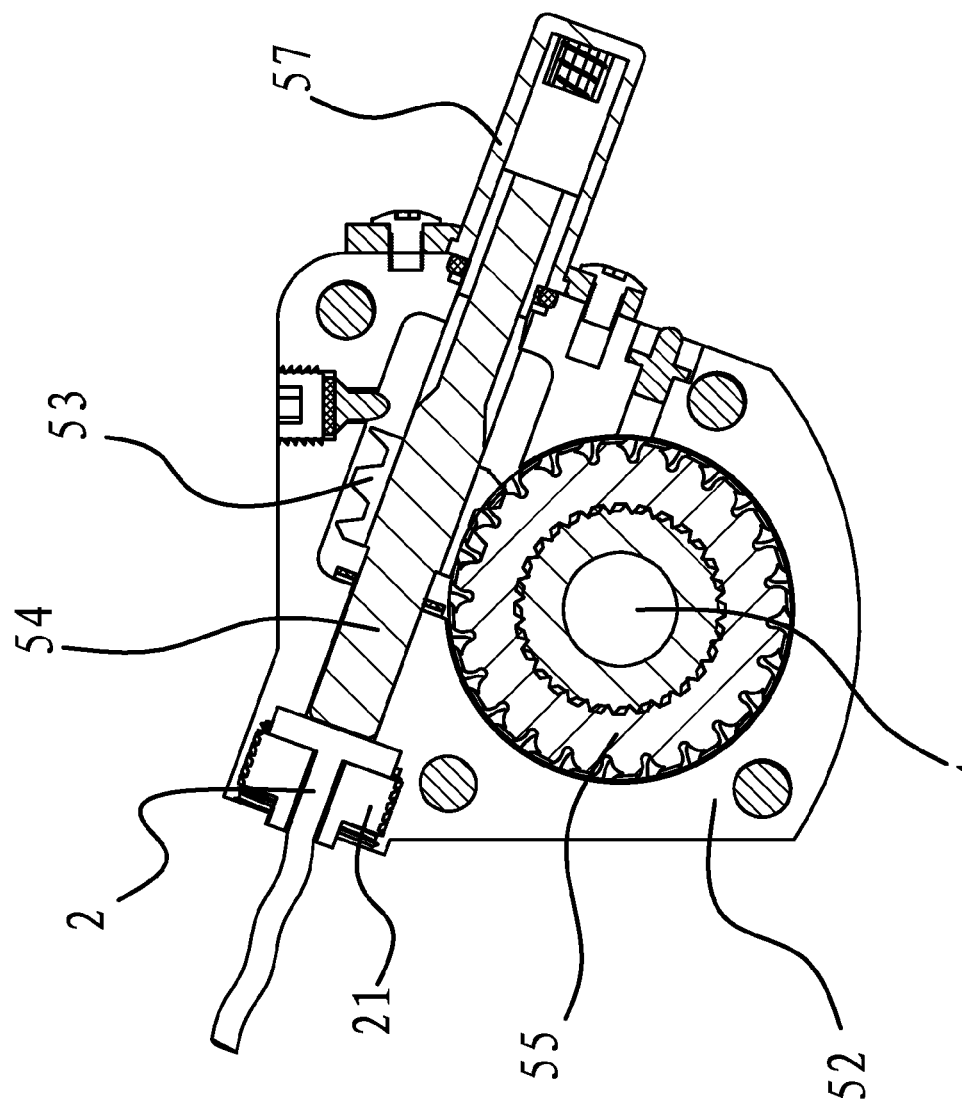
FIG. 7 is a sectional view of the pay-out and take-up device of the invention when the sensor is pressed by the worm axis.
Figure 8:
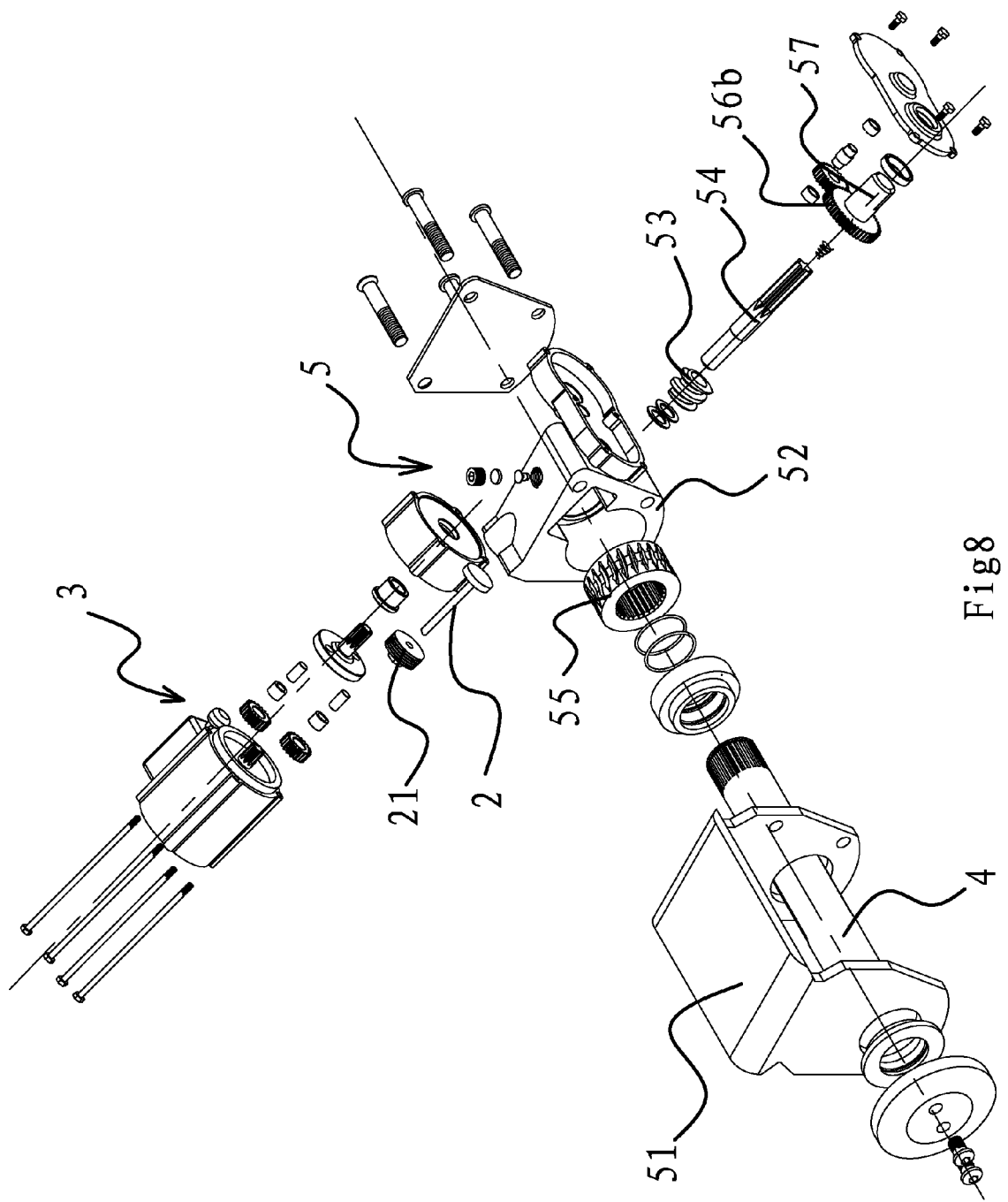
FIG. 8 is an exploded view of the pay-out and take-up device of the invention.

In FIG. 4, the upper controller 11 includes an initialization unit 1f, a query unit 1g for inquiring the current tensioning force of the binding strip for the tightener, a display unit 1h for displaying information and a set unit 1i for setting the predetermined value of the tensioning force of the binding strip or the prompt values of the tensioning force of the binding strip. The initialization unit 1f, query unit 1g, display unit 1h and set unit 1i of the upper controller 11 could operate the lower controller 12 or the entire system.

The upper controller 11 further includes a locking/unlocking unit 1e for making the lower controller 12 in an operation locked status or an operation allowable status. The lower controller 12 could remain in the operation locked status or operation allowable status through the locking/unlocking unit 1e, thereby improving safety of the entire system. The lower controller 12 is not entitled to operate in the operation locked status. In this case, all the operations on the lower controller 12 are invalid. On the other hand, the lower controller 12 could merely be operated in the operation allowable status.

As shown in FIGS. 5-8, the pay-out and take-up device 5 includes a casing 52 fixedly connected to the side of a tightener holder 51, a worm 53, a worm axis 54 and a worm wheel 55 set within the casing 52. The tightener belt axis 4 is rotatably connected with the tightener holder 51 and one end of the tightener belt axis 4 extends out of the tightener holder 51 and is fixedly connected to the worm wheel 55. The worm 53 is covered on the worm axis 54 and fixedly connected thereto. The worm axis 54 is provided on the side of the worm wheel 55 and could move along the axial direction thereof within the casing 52. The power mechanism 3 is connected to the worm axis 54 via a deceleration mechanism 56 and could drive the worm axis 54 to rotate. The sensor 2 is provided at pressurized positions of worm 53 or worm axis 54 within the casing 52. The sensor 2 could transmit a pressure signal corresponding to the tensioning force of the binding strip to the upper controller 11 and/or the lower controller 12 when the sensor 2 is pressed. In said embodiment, the sensor 2 is fixed to the casing 52 through a sensor blockage 21 and the sensor blockage 21 is threadedly connected with the casing 52.

In this embodiment, a rotary liner 57 is axially fixed outside the casing 52. The outer end of the worm axis 54 extends out of the casing 52 and is circumferentially fixed with the rotary liner 57. The worm 53 is engaged with the worm wheel 55 after the rotary liner 57 is turned to move the worm axis 54 toward the inner end. The power mechanism 3 is connected to the rotary liner 57 via the deceleration mechanism 56 and drives the rotary liner 57 to rotate, thereby driving the worm axis 54 to turn. The worm axis 54 is pressed against the sensor 2 and the sensor is pressed when the worm 53 is engaged with the worm wheel 55. In this embodiment, the power mechanism 3 is a pneumatic motor.

In said embodiment, the deceleration mechanism 56 is a deceleration gear box. The deceleration gear box includes a casing 56a within which several engaged deceleration gears 56b are provided. The pneumatic motor is connected with the power output end of the deceleration mechanism 56 which is connected to the rotary liner 57.

During operation, the lower controller 12 could always compare the signal received from the sensor 2 with the predetermined value of the tensioning force of the binding strip. When the tensioning force of the binding strip is varied, the power mechanism 3 is automatically controlled by the lower controller 12 to operate again based on said comparison result, so as to tighten or loosen the binding strip. Therefore, the tensioning force of the binding strip is automatically adjusted to guarantee the safety of transportation.

Second Embodiment

Figure 2:
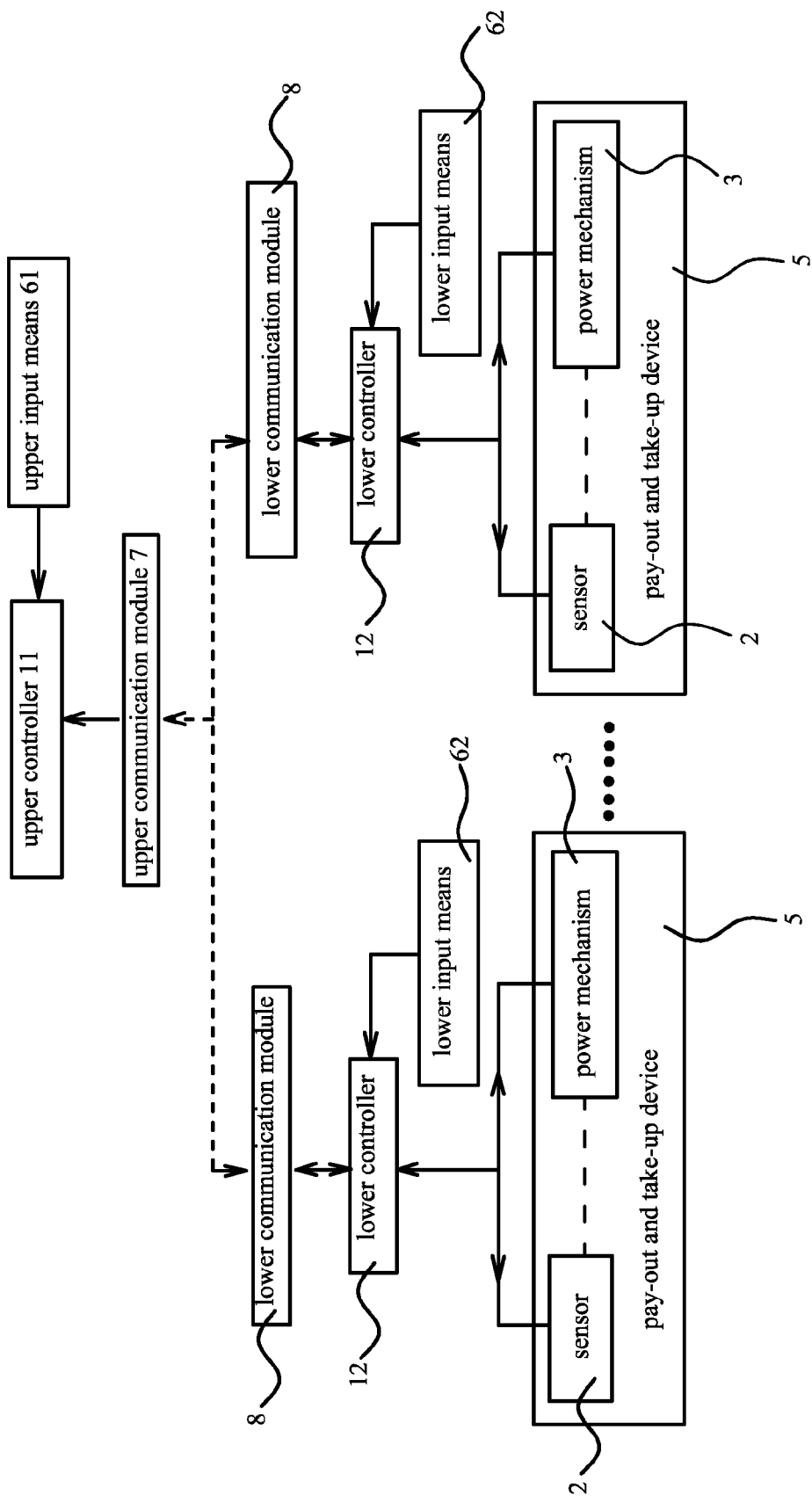
FIG. 2 is a block diagram of the principle of the second embodiment of the present invention.

As shown in FIG. 2, in this embodiment, a plurality of lower controllers 12 are connected with the upper controller 11. Each of the lower controllers 12 is connected to the sensor 2 and the power mechanism 3 correspondingly located on one pay-out and take-up device 5. A lower input means 62 is connected to each of the lower controllers 12 respectively. The plurality of lower controllers 12 could be collectively controlled by the upper controller 1 through such a configuration to form a system in which each tightener could work separately and be controlled in a centralized manner. During transportation, the tensioning force of the binding strip of each tightener could be varied due to bumping and shocking, so that the tensioning force of the binding strip could be too large at some locations and too small at some other locations. In this case, each of the lower controllers 12 could be conveniently controlled by the upper controller 11 to adjust the tensioning force of the binding strip of each tightener.

As shown in FIG. 4, all the tighteners are not operated during actual operation. To this end, in this embodiment, the upper controller 11 further includes a selection unit 1j for activating or deactivating the lower controllers 12. The tighteners required to work could be selected via the selection unit 1j. The power mechanism 3 is out of work when the tightener is deactivated.

The other aspects of the second embodiment will be omitted herein for they are similar to those of the first embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as upper controller 1, lower controller 12, storage unit 1a, comparison unit 1b, control signal generation unit 1c, prompt signal generation unit 1d, locking/unlocking unit 1e, initialization unit 1f, query unit 1g, display unit 1h, set unit 1i, selection unit 1j, clockwise or anti-clockwise rotation control unit 1k, sensor 2, sensor blockage 21, power mechanism 3, tightener belt axis 4, pay-out and take-up device 5, tightener holder 51, casing 52, worm 53, worm axis 54, worm wheel 55, deceleration mechanism 56, casing 56a, deceleration gear 56b, rotary liner 57, upper input means 61, lower input means 62, upper communication module 7, lower communication module 8, prompt light 9 and delay circuit 10, the other similar terms could also be used. These terms are merely used to describe and explain the essence of the invention more conveniently, and any limitation to said terms is regarded as departing from the spirit of the invention.

LIST OF REFERENCE NUMERALS 11 upper controller
12 lower controller
1a storage unit
1b comparison unit
1c control signal generation unit
1d prompt signal generation unit
1e locking/unlocking unit
1f initialization unit
1g query unit
1h display unit
1i set unit
1j selection unit
1k clockwise or anti-clockwise rotation control unit
2 sensor
21 sensor blockage
3 power mechanism
4 tightener belt axis
5 pay-out and take-up device
51 tightener holder
52 casing
53 worm
54 worm axis
55 worm wheel
56 deceleration mechanism
56a casing
56b deceleration gear
57 rotary liner
61 upper input means
62 lower input means
7 upper communication module
8 lower communication module
9 prompt light
10 delay circuit

What is claimed is:

1. An intelligent logistics goods binding system, characterized in that, the system includes an upper controller (11) and a first lower controller (12) connected to the upper controller (11) for digital communication therewith, a sensor (2) and a power mechanism (3) are connected to the lower controller (12), the sensor (2) and the power mechanism (3) are respectively disposed on a pay-out and take-up device (5) driving a tightener belt axis (4) to tighten and loosen a binding strip, an upper input means (61) is further connected to the upper controller (11) for controlling the lower controller (12) or controlling the operation of the power mechanism (3) by the lower controller (12), a lower input means (62) is further connected to the lower controller (12) to control the operation of the power mechanism (3), when the operation of the power mechanism (3) is controlled by the upper controller (11) through the lower controller (12) or directly controlled by the lower controller (12), a tensioning force signal of the binding strip collected by the sensor (2) could be received by the lower controller (12) and compared with a predetermined value of a tensioning force of the binding strip preset in the lower controller (12), and the power mechanism (3) could be controlled by the lower controller (12) to cease operation when the tensioning force signal of the binding strip reaches the predetermined value of the tensioning force of the binding strip.

2. The intelligent logistics goods binding system as claimed in claim 1, characterized in that, an upper communication module (7) is connected to the upper controller (11), and a lower communicate module (8) is connected to the lower controller (12) for digital communication with the upper communication module (7).

3. The intelligent logistics goods binding system as claimed in claim 2, characterized in that, both the upper communication module (7) and the lower communication module (8) are wireless communication modules.

4. The intelligent logistics goods binding system as claimed in claim 1, characterized in that, the lower controller (12) includes a storage unit (1a), a comparison unit (1b) and a control signal generation unit (1c), in which the comparison unit (1b) could receive a tensioning force signals of the binding strip in the sensor (2) and the predetermined value of the tensioning force of the binding strip in the storage unit (1a)

and compare them, and then transfer a comparison result to the control signal generation unit (1c).

5. The intelligent logistics goods binding system as claimed in claim 4, characterized in that, the lower controller (12) further includes a clockwise and anti-clockwise rotation control unit (1k) for controlling a clockwise or anti-clockwise rotation of the power mechanism (3), and the clockwise and anti-clockwise rotation control unit (1k) is connected with the control signal generation unit (1c).

6. The intelligent logistics goods binding system as claimed in claim 4, characterized in that, the lower controller (11) further includes a prompt signal generation unit (1d) which could generate a prompt signal when the tensioning force of the binding strip reaches various prompt values of a tensioning force of the binding strip set in the storage unit (1a) of the lower controller (11), the prompt signal generation unit (1d) is connected to the comparison unit (1b), several prompt lights (9) are connected to the prompt signal generation unit (1d) and could work in sequence and produce lights of different colors when the tensioning force of the binding strip reaches said various prompt values of the tensioning force of the binding strip, and the prompt lights (9) are connected with the prompt signal generation unit (1d) via a delay circuit (10).

7. The intelligent logistics goods binding system as claimed in claim 6, characterized in that, a plurality of lower controllers (12), including said first controller, are connected to the upper controller (11), each of the lower controllers (12) is connected to the sensor (2) and the power mechanism (3) correspondingly located on one pay-out and take-up device (5), and one lower input means (62) is connected to each of the lower controllers (12).

8. The intelligent logistics goods binding system as claimed in claim 7, characterized in that, the upper controller (11) and the lower controllers (12) further respectively include an initialization unit (1f), a query unit (1g) for inquiring a current tensioning force of the binding strip, a display unit (1h) for displaying information and a set unit (1i) for setting the predetermined value of the tensioning force of the binding strip or the prompt values of the tensioning force of the binding strip.

9. The intelligent logistics goods binding system as claimed in claim 7, characterized in that, the upper controller (11) further includes a locking/unlocking unit (1e) for making the lower controllers (12) in an operation locked status or an operation allowable status, and the upper controller (11) further includes a selection unit (1j) for activating or deactivating the lower controllers (12).

10. The intelligent logistics goods binding system as claimed in claim 7, characterized in that, the pay-out and take-up device (5) includes a casing (52) fixedly connected to a side of a tightener holder (51) and a worm (53), a worm axis (54) and a worm wheel (55) set within the casing (52), the tightener belt axis (4) is rotatably connected with the tightener holder (51) with one end of the tightener belt axis (4) extending out of the tightener holder (51) and being fixedly connected to the worm wheel (55), the worm (53) is covered on the worm axis (54) and fixedly connected thereto, the worm axis (54) is provided on a side of the worm wheel (55) and could move along an axial direction thereof within the casing (52), the power mechanism (3) is connected to the worm axis (54) via a deceleration mechanism (56) and could drive the worm axis (54) to rotate, in which the power mechanism (3) is any one selected from the group consisting of an electric motor and a pneumatic motor, the sensor (2) is provided between the casing (52) and the worm (53) or between the casing (52) and the worm axis (54), and the sensor (2) could transmit a pressure signal corresponding to the tensioning force of the binding strip to the lower controller (12) when the sensor (2) is pressed.

* * * * *